April 15, 1924.

J. B. AYERS 1,490,756

EQUALIZING SHOE

Filed June 2, 1923

Inventor
John B. Ayers,
By E. Hume Talbot
Attorney

Patented Apr. 15, 1924.

1,490,756

UNITED STATES PATENT OFFICE.

JOHN B. AYERS, OF DETROIT, MICHIGAN.

EQUALIZING SHOE.

Application filed June 2, 1923. Serial No. 642,976.

*To all whom it may concern:*

Be it known that JOHN B. AYERS, a citizen of the United States of America, residing at Detroit, in the county of Wayne and State of Michigan, has invented new and useful Improvements in Equalizing Shoes, of which the following is a specification.

The purpose of the invention is to provide a device for disposition on the shoulder of the equalizer of a passenger car truck to receive the extremity of the equalizer spring ordinarily bearing upon said shoulder, so as to relieve the extremity of the spring from wear and crystallization due to friction which heretofore has resulted in the breaking of the spring in a short while, whereas with the shoe, the life of the spring is materially lengthened.

With this object in view the invention consists in a construction and combination of parts of which a preferred embodiment is shown in the accompanying drawings, in which.

Figure 1:
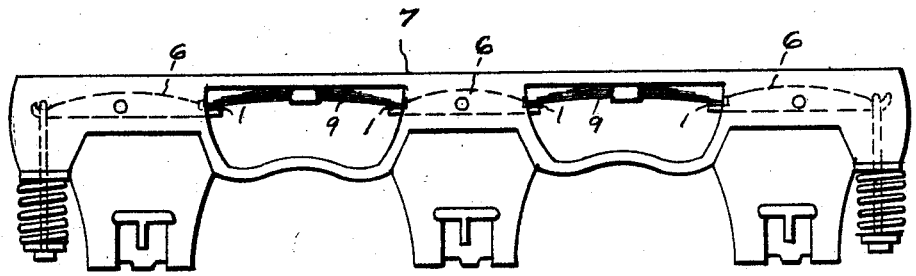
Figure 1 is a side elevational view of a portion of a truck frame showing the equalizer and spring therefor and the use of the invention in connection with the two.
Figure 2:
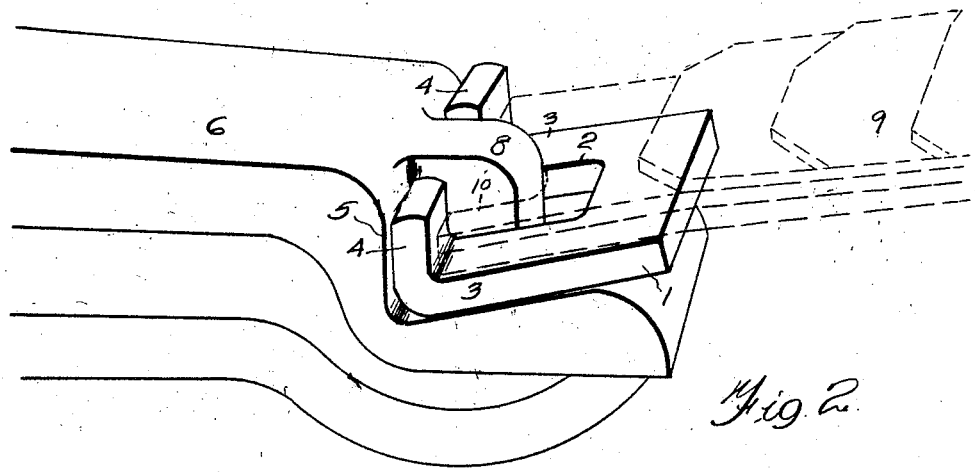
Figure 2 is a detail perspective view showing the extremity of the equalizer and the terminal of the spring with the shoe interposed between them.
Figure 3:
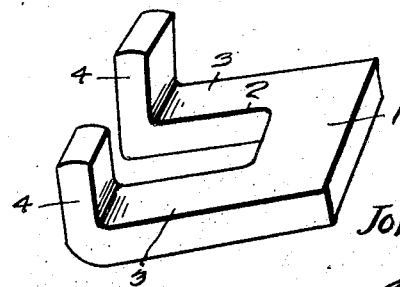
Figure 3 is a perspective view of the shoe.

The invention comprises a shoe consisting of a metal plate 1 slotted as indicated at 2 to provide spaced arms 3 which are upturned at their extremities as indicated at 4 to abut the shoulder 5 of the equalizer bar 6 of the truck frame generally indicated at 7, the slot 2 receiving the rib 8 formed on the equalizer and projecting from the shoulder 5. The shoe is engaged by the extremity of the equalizer spring 9 a terminal of which is slotted as indicated at 10 to straddle the rib 8 as in the ordinary practice. The extremities of the spring on the opposite side of the slot abut the upturned extremities 4 of the arms 3 of the shoe.

In the movement of the equalizer bar to equalize the strains on the springs, a slight movement takes place between the spring and the equalizer and with the employment of the shoe, the sliding movement that ordinarily occurs, takes place between the under surface of the shoe and the face of the equalizer, the shoe remaining substantially fixed with reference to the extremity of the spring so that no wear takes place between it and the spring and thus the latter is protected from the conditions producing crystallization and consequent breakage.

Having described the invention, what is claimed as new and useful is:

1. The combination with the equalizer of a truck frame and spring for the same, of a shoe interposed between the terminal of the spring and the equalizer and having upturned extremities abutting the end of the spring.

2. The combination with the equalizer of a truck frame and spring for the same, the equalizer being formed with a shoulder and a rib projecting from the shoulder and the spring having a terminal slot into which said rib projects, of a shoe slotted to provide spaced arms disposed on opposite sides of the rib and having upturned extremities interposed between the ends of the spring and the shoulder, the arms of the shoe being interposed between the under face of the spring and the equalizer.

In testimony whereof he affixes his signature.

JOHN B. AYERS.